Nov. 5, 1968   R. L. BELONGER ET AL   3,408,944

IMPELLER CONSTRUCTION FOR A CENTRIFUGAL PUMP

Filed Dec. 2, 1966

INVENTORS
ROBERT L. BELONGER
BY DONALD L. SEUSER

Andrus & Starke

Attorneys

United States Patent Office

3,408,944
Patented Nov. 5, 1968

3,408,944
IMPELLER CONSTRUCTION FOR A CENTRIFUGAL PUMP
Robert L. Belonger and Donald L. Seuser, Delavan, Wis., assignors to Sta-Rite Industries, Inc., Delavan, Wis., a corporation of Wisconsin
Filed Dec. 2, 1966, Ser. No. 598,741
6 Claims. (Cl. 103—114)

ABSTRACT OF THE DISCLOSURE

An impeller assembly including a plastic impeller having an axial recess and a plastic insert is bonded within the recess. The insert is reinforced with fibrous material and is provided with a threaded axial bore to receive a drive shaft. The inner end portion of the insert has a substantially larger cross-sectional dimension than the outer end to lock the insert against the axial movement and the outer surface of the insert is provided with longitudinal surface deviations which prevent relative rotation between the insert and the impeller.

---

This invention relates to an impeller construction for a pump, and more particularly to a plastic impeller assembly having an internally threaded plastic insert for connection to a motor drive shaft.

In many types of pumps, and particularly pumps used in water systems, plastic impellers are utilized. A plastic impeller has the advantage of being readily molded at low cost with intricate contours required for the impeller. In the conventional plastic impeller construction, the impeller is connected to the motor drive shaft by means of a metal insert which is molded into the hub of the impeller. Generally, the insert is formed of brass and is internally threaded to receive the motor drive shaft.

For economy in production, the brass insert is generally formed from bar stock and tapped to provide the internal threads. To improve the mechanical bond between the outer surface of the brass insert and the plastic impeller, the outer surface of the insert is generally knurled or roughened. With the use of a metal insert of this type, several problems arise. The outer knurled surface of the insert has relatively sharp edges which tend to produce stresses in the plastic impeller, causing crazing and eventual failure. Moreover, the brass insert and the plastic impeller have substantially different coefficients of thermal expansion and if the impeller assembly is subjected to wide variations in temperature during service, crazing is apt to occur in the plastic impeller. As a further problem, the thermoplastic resin from which the impeller is molded may tend to shrink on aging, and pull away from the brass insert, thereby reducing the mechanical bond between the two members.

The present invention is directed to an improved plastic impeller assembly which utilizes an internally threaded, plastic insert for connection to the motor drive shaft. The internally threaded insert is molded from a thermoplastic resin and is reinforced with fibrous material to provide the desired strength characteristics. According to the invention, the outer surface of the insert is tapered so that the inner end portion of the insert has a larger cross-sectional dimension than the outer end to provide an enlarged, dome-shaped head. In addition, the outer surface of the insert is formed with a series of axial ribs or projections.

The impeller assembly of the invention provides a more positive locking engagement between the insert and the impeller. The enlarged inner head of the insert prevents the insert from being pulled longitudinally from the impeller, and the axially extending ribs prevent relative rotation between the insert and the impeller.

As both the impeller and the insert are molded from thermoplastic resin, and preferably the same thermoplastic resin, both members have the same coefficient of thermal expansion, thereby eliminating the possibility of stresses being set up in the impeller due to differences in the rates of thermal expansion. Moreover, the insert can be molded with generally rounded external surfaces, without sharp corners and edges, and this also serves to minimize the possibility of stress crazing.

As an added advantage, the plastic insert is corrosion resistant and also eliminates the possibility of electrolysis which can occur in pumps using a brass insert.

Other objects and advantages will appear in the course of the following description.

The drawings illustrate the best mode presently contemplated of carrying out the invention.

Figure 1:
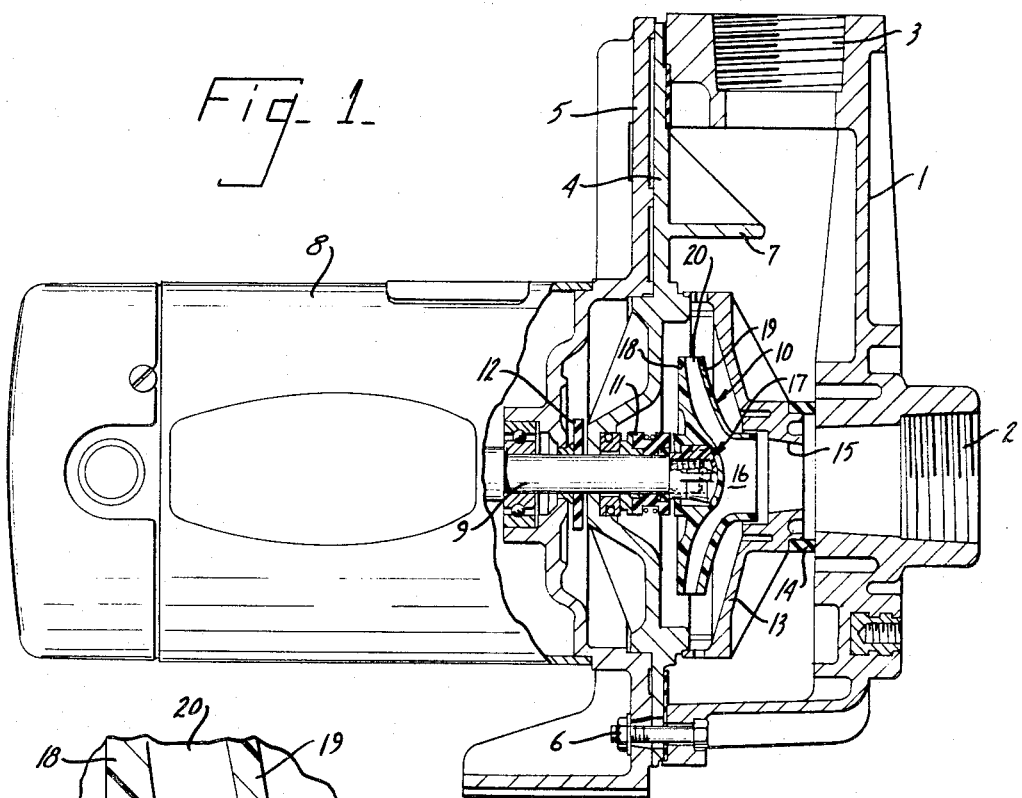
FIG. 1 is a longitudinal section of a typical pump employing the impeller assembly of the invention.
Figure 2:
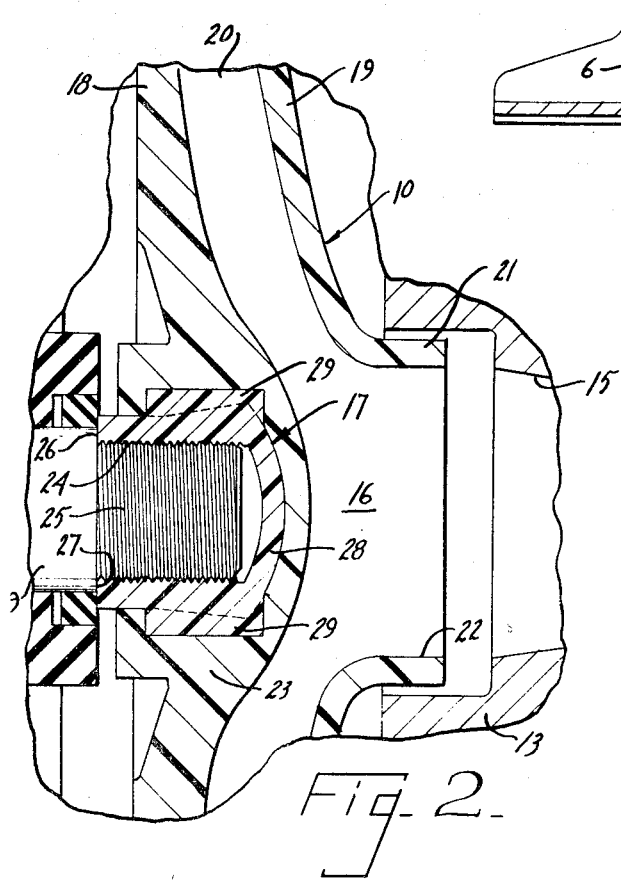
FIG. 2 is an enlarged fragmentary longitudinal section of the impeller assembly.
Figure 3:
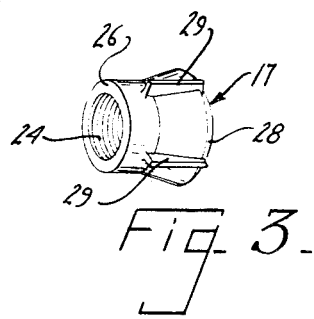
FIG. 3 is a perspective view of the impeller insert.

The drawings illustrate a typical self-priming, centrifugal pump utilizing the impeller assembly of the invention. The pump illustrated in the drawings is a type that is commonly used for swimming pools but the impeller assembly of the invention is not limited to use with a pump of this type and can be used in any conventional centrifugal pump.

The pump illustrated in the drawings comprises a tank body 1 having a liquid inlet 2 and a liquid outlet 3. The rear side of the body 1 is enclosed by a seal plate 4 and the seal plate, as well as the body 1, are connected to a motor mounting plate 5 by a series of bolts 6. Located within the body 1 is a conventional priming baffle 7.

A motor 8 is supported by the mounting plate 5, and the motor drive shaft 9 carries the impeller assembly 10 of the invention.

To prevent leakage of the pumped liquid along the drive shaft 9, a conventional mechanical seal assembly 11 is associated with the drive shaft. In addition to the seal assembly 11, a slinger 12 is mounted between the seal assembly and the motor 8 and serves to throw any foreign particles, which may pass through the seal, outwardly and thereby prevent the particles from contacting the motor shaft bearings.

Surrounding the impeller assembly 10 is a diffuser 13 which is positioned in the body 1 by a diffuser seal ring 14. Diffuser 13 is provided with an axial opening 15 which is in alignment with the inlet 2.

The impeller assembly 10 includes a plastic impeller 16 and a plastic threaded insert 17 which is molded into the hub of the impeller. The impeller 16 comprises a generally flat back plate 18 and a curved front plate 19 which are spaced apart by a series of curved vanes or blades 20. An annular flange 21 extends outwardly from the front plate 19 and defines an inlet opening 22 through which the liquid is supplied to the impeller 16.

The central portion of the back plate 18 defines a hub 23, and the hub is provided with an axial opening which receives the plastic insert 17. Insert 17 is formed with an internally threaded axial opening 24 which receives the threaded outer end 25 of motor drive shaft 9.

The outer end 26 of the insert 17 is generally flat and projects outwardly beyond the back plate 18 and is adapted to bear against the shoulder 27 of the drive shaft 9 when the impeller assembly is threaded down onto the motor drive shaft.

The outer surface of insert 22 is tapered so that the inner end portion of the insert has a greater diameter than the outer end 25, and the inner end terminates in a generally rounded or dome-shaped head 28. The enlarged, dome-shaped head 28 serves to prevent the insert from being pulled out of the impeller hub 21.

The insert 17 is also formed with a series of axially extending external ribs 29. The drawings illustrate four ribs on the surface of the insert 17, but it is contemplated that any number of ribs can be utilized. The ribs serve to prevent relative rotation between the insert 17 and the hub 23.

The impeller 16 and the insert 17 are formed of a thermoplastic resin, and preferably the same thermoplastic resin. It has been found that acrylic resins, such as methyl methacrylate sold under the tradename of Lucite, are very satisfactory materials for molding the impeller and insert. As both the impeller and the insert are formed of a thermoplastic resin, the coefficient of thermal expansion of both elements will be substantially the same, and this minimizes the possibility of crazing of the impeller due to stresses produced by temperature variations in service. Moreover, the insert is molded so that there are no sharp corners or edges on the external surface. This again reduces the magnitude of stresses developed in the plastic impeller which can result in crazing and failure.

To increase the strength of the insert 17, it is preferred to reinforce the insert with a fibrous filler. In most cases, from 10% to 40% by weight of a fibrous reinforcing material can be incorporated in the thermoplastic resin when molding the insert. The fibrous reinforcement may take the form of mineral fibers, such as glass or asbestos; synthetic fibers such as rayon, nylon or Orlon; vegetable fibers such as cotton; animal fibers such as wool; or metal reinforcement such as steel wire. It has been found that glass fibers having a length of approximately ⅛ of an inch are particularly satisfactory as the reinforcing material for the insert 17.

In fabricating the impeller assembly 10, the insert 17 is initially molded by conventional techniques. After molding, a stud is threaded into the opening 24 in the insert 17 and serves as a support to properly position the insert within the impeller mold, as well as preventing collapse of the insert due to the molding pressures. With the insert properly positioned in the impeller mold, the impeller is molded by conventional injection molding techniques. During molding, the heated thermoplastic resin being injected into the mold will serve to melt a thin layer of resin on the outer surface of the insert. As both the insert and the impeller are formed of the same resin, this fusion of the outer layer of the insert serves to weld or chemically bond the two members together to thereby increase the connection between the members.

The impeller assembly of the invention provides a more positive connection of the impeller to the drive shaft than conventional plastic impeller assemblies utilizing a brass or metallic insert. The plastic insert is molded with an enlarged head which prevents the insert from being pulled from the impeller, and is also formed with a series of ribs or surface deviations which prevent relative rotation between the insert and the impeller hub.

The construction of the invention also minimizes crazing of the plastic impeller. The insert is molded with a generally rounded configuration without sharp corners or edges. By eliminating sharp corners and edges, the tendency for stress crazing is minimized. As an added advantage, both the impeller and the insert are generally formed of the same thermoplastic resin with the result that both elements have the same coefficient of thermal expansion. This again reduces the tendency for thermal stress crazing.

As the impeller assembly of the invention utilizes a plastic insert as well as a plastic impeller, impeller corrosion is eliminated and electrolysis due to the presence of dissimilar metals is also eliminated.

Various modes of carrying out the invention are contemplates as being within the scope of the following claims particularly pointing out and distinctly claiming the subject matter which is regarded as the invention.

We claim:

1. An impeller assembly, comprising a plastic impeller including a central hub having an axially extending recess, a plastic insert bonded within the recess and having an outer end facing outwardly of said impeller, said insert being reinforced with fibrous material, said outer end having a threaded axial bore to receive a drive shaft, the inner end portion of said insert having a substantially larger cross-sectional dimension than said outer end to prevent said insert from being pulled from said impeller, and at least one generally longitudinally extending surface deviation on the outer surface of the insert and acting to prevent relative rotation between the insert and the impeller.

2. The impeller assembly of claim 1, in which the inner end of the insert terminates in a generally dome-shaped head.

3. The impeller assembly of claim 1, in which both the impeller and the insert are formed of thermoplastic resin and have substantially similar coefficients of thermal expansion.

4. The impeller assembly of claim 1, in which the plastic insert is reinforced with 10% to 40% by weight of fibrous material.

5. The impeller assembly of claim 1, in which said surface deviations comprise a series of axially extending ribs.

6. The impeller assembly of claim 1, in which said outer end of the insert is generally flat and projects axially beyond the impeller.

References Cited

UNITED STATES PATENTS

| | | | |
|---|---|---|---|
| 1,323,533 | 12/1919 | Hurt | 103—114 |
| 2,652,190 | 9/1953 | Meltzer et al. | 230—134 |
| 3,039,397 | 6/1962 | Prasse et al. | 103—114 |
| 3,272,137 | 9/1966 | Maitlen et al. | 103—114 |

FOREIGN PATENTS 577,756   5/1946   Great Britain.

HENRY F. RADUAZO, *Primary Examiner.*